United States Patent [19]
Grun et al.

[11] Patent Number: 6,081,848
[45] Date of Patent: Jun. 27, 2000

[54] STRIPING PACKETS OF DATA ACROSS MULTIPLE VIRTUAL CHANNELS

[75] Inventors: Paul A. Grun, Tigard; William Futral, Portland, both of Oreg.

[73] Assignee: Intel Corporation, Santa Clara, Calif.

[21] Appl. No.: 09/134,737

[22] Filed: Aug. 14, 1998

[51] Int. Cl.[7] .............................. G06F 3/00; G06F 13/00
[52] U.S. Cl. .............................. 710/1; 710/100; 370/912
[58] Field of Search ................................. 710/1, 23, 33, 710/35, 52, 62, 129, 100; 709/212, 218, 238, 250, 301, 200; 340/825; 711/112, 203; 370/329, 412, 420, 257, 341, 438, 912, 397

[56] References Cited

U.S. PATENT DOCUMENTS

| | | |
|---|---|---|
| 5,546,379 | 8/1996 | Thaweethai et al. . |
| 5,864,542 | 1/1999 | Gupta et al. . |
| 5,970,066 | 10/1999 | Lowry et al. . |
| 5,991,797 | 11/1999 | Futral et al. . |
| 6,005,851 | 12/1999 | Craddock et al. . |

OTHER PUBLICATIONS

Intel and the VI Initiative—The Virtual Architecture, printed May 11, 1998.

*Primary Examiner*—Gopal C. Ray
*Attorney, Agent, or Firm*—Antonelli, Terry, Stout & Kraus, LLP

[57] ABSTRACT

An I/O unit for transporting a data block having a plurality of data packets across an interconnect includes an I/O controller and a memory coupled to the I/O controller for storing the data block. The I/O unit further includes a DMA object created by the controller and referring to the data block, and a transport that has a first and second VI queue pair, with each queue pair being coupled to the interconnect. The I/O unit further includes a first descriptor created by the transport and referring to a first data packet, and a second descriptor created by the transport and referring to a second data packet.

26 Claims, 2 Drawing Sheets

STRIPING PACKETS OF DATA ACROSS MULTIPLE VIRTUAL CHANNELS

FIELD OF THE INVENTION

The present invention is directed to data communication on a computer network. More particularly, the present invention is directed to striping packets of data across multiple virtual channels within a computer network.

BACKGROUND OF THE INVENTION

A computer frequently communicates with an input/output ("I/O") unit. The communication typically entails sending data across an interconnect at a high speed.

One of the most significant problems confronting this high-speed communication is the magnitude of processor and software overhead normally required. For example, a processor in the computer may need to dynamically configure the bandwidth of the data transfer based on available resources in order to efficiently transfer the data. This process requires large software overhead which can prevent the processor in the computer, or an I/O controller in the I/O unit, from performing other tasks in a timely manner.

Based on the foregoing, there is a need for an method and apparatus to efficiently transfer data between a computer and an I/O unit.

SUMMARY OF THE INVENTION

One embodiment of the present invention is an I/O unit for transporting a data block having a plurality of data packets across an interconnect. The I/O unit includes an I/O controller and a memory coupled to the I/O controller for storing the data block. The I/O unit further includes a DMA object created by the controller and referring to the data block, and a transport that has a first and second VI queue pair, with each queue pair being coupled to the interconnect. The I/O unit further includes a first descriptor created by the transport and referring to a first data packet, and a second descriptor created by the transport and referring to a second data packet.

DETAILED DESCRIPTION

One embodiment of the present invention combines multiple physical channels into a single logical channel that can be used to transport data between an I/O unit and a host computer. An I/O unit includes one or more I/O controllers and an interface to an interconnect.

Figure 1:
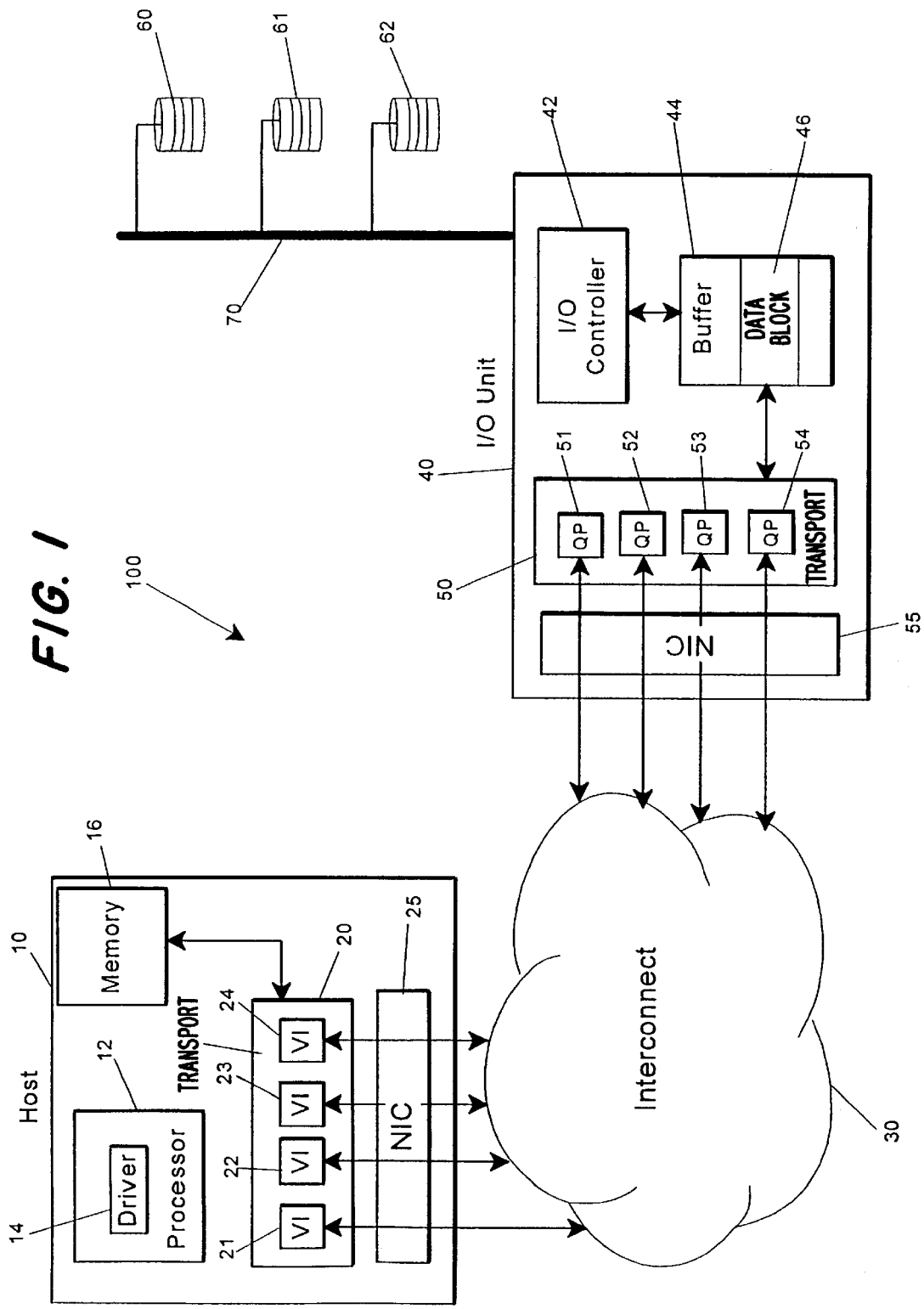
FIG. 1 is block diagram of a networked computer system in accordance with one embodiment of the present invention.

FIG. 1 is block diagram of a networked computer system in accordance with one embodiment of the present invention. The computer system 100 includes a host computer 10 and an I/O unit 40 coupled by an interconnect 30.

Interconnect 30 functions as an interface between networked devices. In one embodiment, interconnect 30 is a collection of switched connections that is created by combining multiple switches together. However, interconnect 30 can be any known infrastructure for connecting together networked devices. For example, interconnect 30 can comprise one or more direct connections (e.g., a wire, a local area network, or any other type of network), or one or more variable and dynamic connections (e.g., switches). Other networked devices (not shown in FIG. 1) that are included in computer system 100 could also be coupled to interconnect 30.

Host computer 10 includes a processor 12. Processor 12 executes a software application that includes a driver 14. Host 10 further includes a memory 16 and a transport 20. Host 10 further includes a network interface card ("NIC") 25 that couples host 10 to interconnect 30.

Host computer 10 communicates with devices coupled to interconnect 30 using a Virtual Interface ("VI") architecture. A VI architecture provides the illusion of a dedicated network interface to multiple applications and processes simultaneously, thus "virtualizing" the interface. Further, a VI architecture defines a standard interface between a VI consumer and one or more networks. In the present invention, driver 14 functions as a VI consumer.

In one embodiment, the VI architecture used to implemented the present invention is disclosed in the *Virtual Interface Architecture Specification. Version* 1.0, (the "VI Specification") announced Dec. 19, 1997 by Compaq Corp., Intel Corp., and Microsoft Corp. The VI Specification is available at web site http://www.viarch.org/ on the Internet. The VI Specification defines mechanisms for low-latency, high-bandwidth message-passing between interconnected nodes and interconnected storage devices. Low latency and sustained high bandwidth are achieved by avoiding intermediate copies of data and bypassing the operating system when sending and receiving messages. Other architectures that perform a similar function as the VI architecture disclosed in the VI Specification can also be used to implement the present invention, and therefore the present invention is not limited to the VI architecture.

Transport 20 includes a plurality of VIs 21–24. Each VI 21–24 includes a queue pair ("QP"). In accordance with the VI Specification, a QP includes a send queue and a receive queue. In one embodiment, each VI 21–24 has a physical port into interconnect 30 via NIC 25. However, in other embodiments, VIs 21–24 can share physical ports.

I/O unit 40 includes an I/O controller 42, a buffer memory 44 and a transport 50. An I/O controller is a device which provides I/O services to one or more host computers. The I/O services include storing and retrieving data, and transferring data to other devices. In other embodiments, I/O unit 40 includes two or more I/O controllers 42. Buffer memory 44 is a storage area that is coupled to I/O controller 40 and can be located anywhere. In one embodiment, buffer memory 44 is a separate storage device. In other embodiments, buffer memory 44 is part of disk drives 60–62, or is connected via a network to I/O controller 42.

Transport 50 includes QPs 51–54. A QP in I/O unit 40 and a corresponding VI in host 10 are endpoints of a virtual channel through interconnect 30. Although computer system 100 includes the same number of QPs 51–54 as VIs 21–24, in other embodiments the number of VIs in host 10 can differ from the number of QPs in I/O unit 40. However, each virtual channel through interconnect 30 has as endpoints one VI and one QP.

I/O unit 40 further includes a NIC 55 that couples I/O unit 40 to interconnect 30. In one embodiment, each QP 51–54 has a physical port into interconnect 30 through NIC 55. However, in other embodiments, QPs 51–54 can share physical ports.

I/O unit 40 further includes a plurality of disk drives 60–62 coupled to a bus 70. Disk drives 60–62 store data that can be accessed by host 10. In other embodiments, instead of disk drives 60–62, I/O unit 40 can include any other device that stores and/or retrieves data, or receives and forwards data to other devices. For example, I/O unit 40 can include a CD ROM drive, a tape drive, a network interface to a local area network, etc.

Within computer system 100, driver 14 is referred to as an "initiator" because it initiates requests for I/O services. In contrast, I/O controller 42 is referred to as a "target" because it responds to I/O requests from initiators within computer system 100. I/O controller 42 responds to I/O requests by, for example, storing data on drives 60–62 or retrieving data from drives 60–62.

An I/O service request can be generated by driver 14. An example of an I/O service request is a request to read a number of blocks of data from a logical block address in some storage device and return the data to a memory location in host 10. Driver 14 stores the I/O request in a location of memory 16. In accordance with the VI specification, driver 14 posts a descriptor that refers to the I/O request (i.e., specifies the location in memory 16 where the I/O request is stored) to a send queue in transport 20. Driver 14 then rings a doorbell in NIC 25. The doorbell tells NIC 25 to look in the send queue for the descriptor. NIC 25 then fetches the descriptor and performs the task. The task places an I/O request message on interconnect 30 to be transmitted. The receiving device (e.g., I/O unit 30) of the I/O request also has a NIC that receives the I/O request message from interconnect 30.

The I/O request message contains information specifying the location in host memory 16 to which the data is to be moved, and specifies the location on the disk drives 60–62 from which the data is to be fetched. The location in host memory 16 is specified with a virtual address memory handle pair in accordance with the VI specification. I/O controller 42 uses the information contained in the I/O request message to build descriptors to accomplish the actual data movement from I/O unit 40 to host 10.

One embodiment of the present invention provides an efficient transfer of data from I/O unit 40 to host 10. In operation, driver 14 sends an I/O request to I/O unit 40 to retrieve a block of data (data block 46) from disk drives 60–62. The request is passed to I/O controller 42. In one embodiment, I/O controller 42 retrieves the requested data block 46 from drives 60–62 and stores data block 46 in buffer 44.

Figure 2:
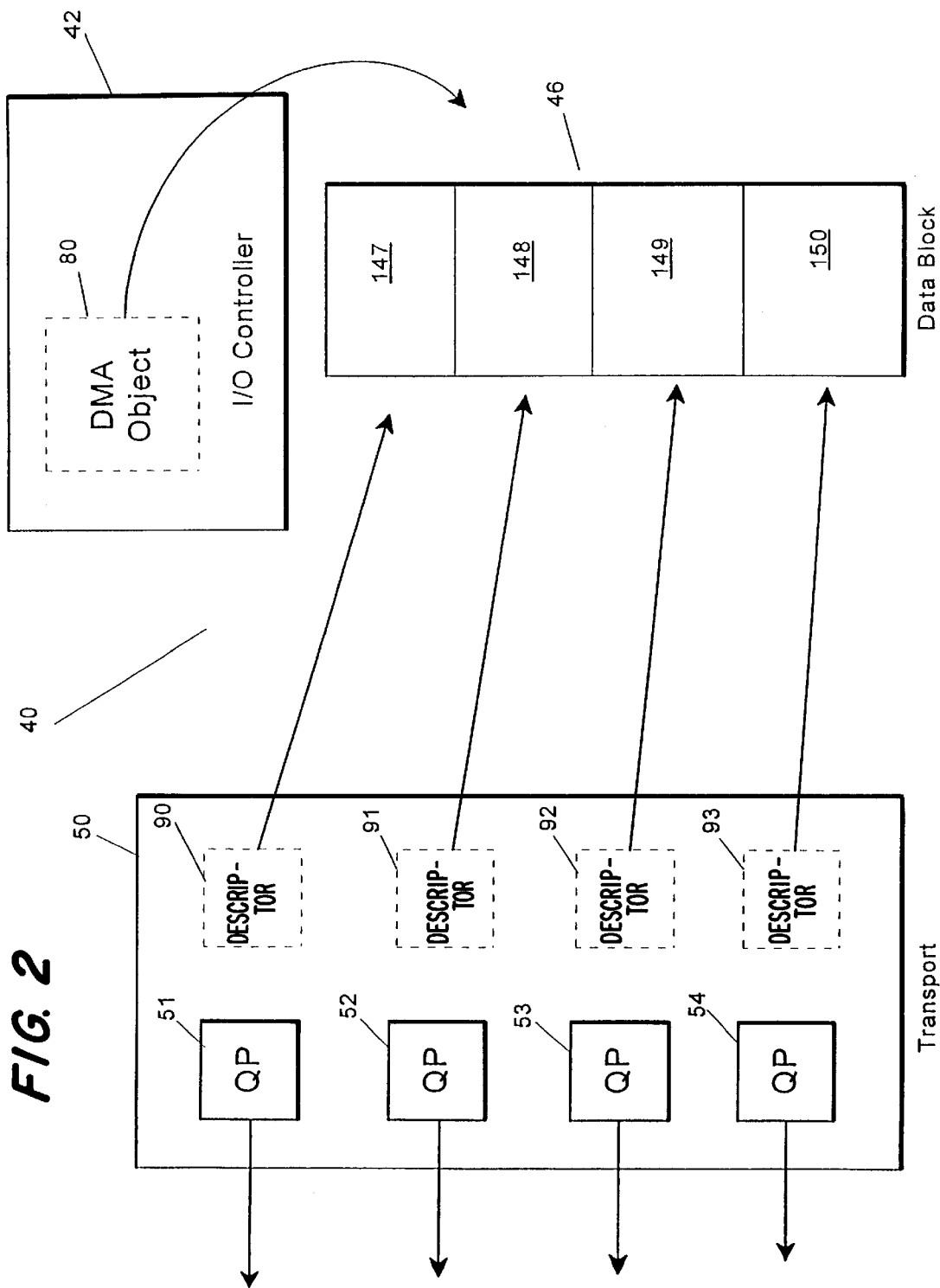
FIG. 2 is a detailed block diagram of an I/O unit.

FIG. 2 is a detailed block diagram of I/O unit 40 that illustrates the steps executed by I/O unit 40 once data block 46 is stored in buffer 44. The goal of I/O unit 40 is to move data block 46 into memory 16 of host computer 10.

First, I/O controller 42 creates a direct memory access ("DMA") object 80 that refers to data block 46 in buffer 44. DMA object 80 specifies the starting address of data block 46, the length of data block 46, and the destination of data block 46. The destination tells transport 50 where to send data block 46. The destination includes the endpoint across interconnect 30 to which data block 46 is to be sent, and the memory address at that endpoint where data block 46 is to be stored.

I/O controller 42 passes DMA object 80 to transport 50. In one embodiment, transport 50, before receiving DMA object 80, has already created the correct number of QPs 51–54 based on the number of physical channels between I/O unit 40 and host 10. In another embodiment, transport 50 dynamically creates the necessary number of QPs upon receiving DMA object 80. In this embodiment, a network services unit is connected to interconnect 30 in FIG. 1. The network services unit is responsible for managing interconnect 30 and creating virtual connections in interconnect 30. Transport 50 specifies to the network services unit the required number of virtual channels based on the number of physical links, and then creates the corresponding QPs.

Transport 50 creates one or more descriptors 90–93 for each QP in transport 50. In one embodiment, each QP in transport 50 corresponds to a physical port into interconnect 30. In other embodiments, there can be less physical ports than QPs in transport 50. Each descriptor 90–93 describes a partitioned portion, or "packet" of data block 46. For example, descriptor 90 represents data packet 147, descriptor 91 represents data packet 148, etc. Packets 147–150 can be of varying size depending on the algorithm used to partition data block 46. For example, in one embodiment, each packet 147–150 is equal size. In another embodiment, an algorithm is used to determine the size of each packet 147–150 based on the operating characteristics of the available physical connections between host 10 and I/O unit 40 in interconnect 30.

Each descriptor 90–93 is then posted into its respective QP 51–54. QPs 51–54 move the packet represented by its descriptor 90–93 to their physical port for transport across interconnect 30. Therefore, the packets are "striped" across multiple physical connections. The order that each descriptor 90–93 is moved across interconnect 30 is arbitrary.

In the embodiment shown in FIG. 2, all four QPs 51–54 run in parallel because they each have a separate physical connection. However, the multiple physical connections are abstracted from I/O controller 42. Therefore, it appears to I/O controller 42 and to driver 14 that there is one virtual channel running with four times the bandwidth of a single physical channel.

I/O controller 42 is only aware of creating a single DMA object 80 for the entire data block 46. Transport 50 implements the functionality of striping data block 46 over multiple physical channels, thus alleviating the overhead from I/O controller 42.

As described, the VI in transport 50 is used to give driver 14 or any other initiator in host 10 the illusion of an arbitrarily large bandwidth. Further, transport 50 combines multiple physical channels into one large logical channel without imposing any increased overhead on I/O controller 42 or processor 12.

Several embodiments of the present invention are specifically illustrated and/or described herein. However, it will be appreciated that modifications and variations of the present invention are covered by the above teachings and within the purview of the appended claims without departing from the spirit and intended scope of the invention.

For example, one additional embodiment of the present invention can involve the transfer of data between a host computer and another computer, instead of between a host computer and I/O unit 40. In this inter-processor communication ("IPC") environment, the other computer includes a processor that performs the functions of I/O controller 42. All other elements of the other computer are similar to I/O unit 40, and the data is transferred in an identical manner as described herein.

What is claimed is:

1. An input/output (I/O) unit for transporting a data block across an interconnect, the data block comprising a plurality of data packets, said I/O unit comprising:

an I/O controller;

a memory coupled to said I/O controller for storing the data block;

a direct memory access (DMA) object created by said controller and referring to the data block;

a transport having a first and second virtual interface (VI) queue pair, each queue pair coupled to said interconnect;

a first descriptor created by said transport and referring to a first data packet; and a second descriptor created by said transport and referring to a second data packet.

2. The I/O unit of claim 1, wherein each queue pair is coupled to said interconnect through a physical port.

3. The I/O unit of claim 1, wherein said first descriptor is posted on said first queue pair and said second descriptor is posted on said second queue pair.

4. The I/O unit of claim 1, wherein said DMA object comprises:
   a starting address of the data block;
   a length of the data block; and
   a destination of the data block.

5. The I/O unit of claim 1, further comprising a network interface controller coupled to said transport and the interconnect.

6. The I/O unit of claim 1, wherein said first data packet and said second data packet form the data block.

7. The I/O unit of claim 1, further comprising
   a third descriptor created by said transport and referring to a third data packet;
   wherein said first data packet, said second data packet, and said third data packet form the data block.

8. The I/O unit of claim 1, wherein said first and second queue pair each comprise a send queue and a receive queue.

9. The I/O unit of claim 1, further comprising:
   a disk drive coupled to said I/O controller.

10. The I/O unit of claim 1, wherein a first virtual connection comprises said first VI queue pair and a virtual interface coupled to said interconnect.

11. A method of transporting a data block across an interconnect to a host computer, said method comprising:
   (a) storing the data block in memory;
   (b) creating a direct memory access (DMA) object that refers to the data block;
   (c) partitioning the data block into a plurality of data packets;
   (d) creating a plurality of descriptors, each of said descriptors referring to one of said data packets;
   (e) posting said plurality of descriptors into virtual interface queue pairs, said queue pairs coupled to virtual channels that are coupled to the host computer; and
   (f) moving said plurality of data packets across said interconnect on the virtual channels.

12. The method of claim 11, wherein the host computer comprises virtual interfaces and the virtual channels are coupled to the virtual interfaces.

13. The method of claim 11, wherein each of said data packets is equal size.

14. The method of claim 11, wherein said data packets differ in size.

15. The method of claim 11, wherein said DMA object comprises:
   a starting address of the data block;
   a length of the data block; and
   a destination of the data block.

16. A computer for transporting a data block across an interconnect, the data block comprising a plurality of data packets, said computer comprising:

a processor;

a memory coupled to said processor for storing the data block;

a direct memory access (DMA) object created by said controller and referring to the data block;

a transport having a first and second virtual interface (VI) queue pair, each queue pair coupled to said interconnect;

a first descriptor created by said transport and referring to a first data packet; and a second descriptor created by said transport and referring to a second data packet.

17. A networked computer system comprising:

an interconnect;

a host computer coupled to said interconnect, said host computer comprising a first transport having a first and second virtual interface;

an I/O unit coupled to said interconnect, said I/O unit comprising
   an I/O controller;
   a first memory coupled to said I/O controller for storing a data block;
   a direct memory access (DMA) object created by said controller and referring to the data block;
   a second transport having a first queue pair coupled to said first virtual interface to form a first virtual channel and a second queue pair coupled to said second virtual interface to form a second virtual channel;
   a first descriptor created by said second transport and referring to a first data packet; and
   a second descriptor created by said second transport and referring to a second data packet.

18. The networked computer system of claim 17, wherein said first and second queue pairs are coupled to said interconnect through a physical port.

19. The networked computer system of claim 17, wherein said first descriptor is posted on said first queue pair and said second descriptor is posted on said second queue pair.

20. The networked computer system of claim 19, wherein said driver is an initiator and said I/O controller is a target.

21. The networked computer system of claim 17, wherein said DMA object comprises:
   a starting address of the data block;
   a length of the data block; and
   a destination of the data block.

22. The networked computer system of claim 17, said I/O unit further comprising a network interface controller coupled to said second transport and said interconnect.

23. The networked computer system of claim 17, wherein said first data packet and said second data packet form the data block.

24. The networked computer system of claim 17, wherein said first and second queue pair each comprise a send queue and a receive queue.

25. The networked computer system of claim 17, said I/O unit further comprising:
   a disk drive coupled to said I/O controller.

26. The networked computer system of claim 17, said host computer further comprising:
   a processor executing a driver; and
   a second memory coupled to said processor for storing said first data packet and said second data packet when received from said I/O unit.

* * * * *